US008076384B2

(12) United States Patent
Xu et al.

(10) Patent No.: US 8,076,384 B2
(45) Date of Patent: Dec. 13, 2011

(54) FREE RADICAL POST-CROSSLINKED ADSORBENT AND METHOD OF PREPARATION

(75) Inventors: Mancai Xu, Changsha (CN); Zheng Zhang, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 264 days.

(21) Appl. No.: 12/456,019

(22) Filed: Jun. 10, 2009

(65) Prior Publication Data

US 2009/0326086 A1 Dec. 31, 2009

(30) Foreign Application Priority Data

Jun. 26, 2008 (CN) .......................... 2008 1 0125085

(51) Int. Cl.
*C08J 9/00* (2006.01)
(52) U.S. Cl. .......... 521/99; 521/131; 521/142; 521/146; 502/402
(58) Field of Classification Search ........... 502/402; 521/99, 131, 142, 146
See application file for complete search history.

(56) References Cited

U.S. PATENT DOCUMENTS

| 4,543,365 A | 9/1985 | Itagaki et al. |
| 5,218,004 A | 6/1993 | Meteyer et al. |
| 5,624,880 A * | 4/1997 | Steffier .......................... 502/402 |
| 5,885,638 A | 3/1999 | Takayanagi et al. |
| 6,147,127 A | 11/2000 | Lundquist et al. |
| 6,235,802 B1 | 5/2001 | Lundquist et al. |
| 6,541,527 B1 | 4/2003 | Ihm et al. |
| 2005/0054742 A1 * | 3/2005 | Mori et al. .......................... 521/65 |

FOREIGN PATENT DOCUMENTS

| EP | 1018367 | 12/2000 |
| EP | 1350809 | 8/2003 |

OTHER PUBLICATIONS

Zhou et al., "Postcrosslinking of Macrolporous Styrene-Divinylbenzene Copolymers via Pendant Vinyl Groups: Effect of the Starting Copolymers on the Pore Structure of the Postcrosslinked Product", J. Appl. Polym. Schi., vol. 83, 1668-77, 2002, (hereinafter "Zhou").*

* cited by examiner

*Primary Examiner* — Irina S Zemel
(74) *Attorney, Agent, or Firm* — Tifani M. Cottingham

(57) ABSTRACT

A post-crosslinked adsorbent comprises: monomer units of (a) at least 55 wt % at least one polyvinylaromatic monomer and (b) up to 45 wt % at least one monovinylaromatic monomer; and 0.5-2.5 mmol/g pendent vinyl groups; wherein the dry adsorbent has BET specific surface area in the range of about 650-1000 m2/g, BET average pore diameter 7.2-10 nm, BET porosity 1.29-2.45 mL/g, BJH adsorption micropore volume was less than 20% of total BJH adsorption pore volume, and HK micropore volume was less than 21% of total BJH adsorption pore volume. The invention is also directed to a preparation method for the polymeric adsorbent.

8 Claims, No Drawings

FREE RADICAL POST-CROSSLINKED ADSORBENT AND METHOD OF PREPARATION

BACKGROUND

This patent application claims the benefit of the earlier filed Chinese Patent Application Number 2008-10125085.0 filed on Jun. 26, 2008 under 37 CFR 1.55(a).

The present invention relates generally to a post-crosslinked polymeric adsorbent and a one-pot method for preparing the post-crosslinked polymeric adsorbent with high porosity and high surface area.

Porous cross-linked aromatic copolymer are widely used as adsorbents for separation and purification of organic compounds. The adsorption capacity of polymeric adsorbents generally increases with the increasing of surface area and porosity. One of the effective methods to increase the surface area and porosity of porous cross-linked aromatic copolymers is to increase the cross-linkage to a highly cross-linked extent by increasing the content of cross-linker, as described in C. Zhou et al., *Journal of Applied Polymer Science*, John Wiley & Sons, Inc., Vol. 83, 1668-1677(2002), and Q. Yao et al., *Lizi Jiaohuan yu Xifu*, Vol. 19, 98-103(2003), or reacting residual vinyl groups in the copolymers, as described in U.S. Pat. Nos. 4,543,365, 5,218,004, 5,885,638, 6,147,127, 6,235,802, 6,541,527, A. K. Nyhus, et al., *Journal of Polymer Science, Part A: Polymer Chemistry*, John Wiley & Sons, Inc., Vol. 38, 1366-1378(2000), and K. Aleksieva, et al., *Polymer*; Elsevier Science Publishers, Vol. 47, 6544-6550(2006). The highly cross-linked copolymers have high porosity and high surface area, and thus show good adsorption performance, especially of small molecules, with the high surface area. However, distilling removal of the porogen and drying of the initial copolymer result in an increasing of micropore content which may exceed as much as 30% of total pore volume. When the high micropore content adsorbent is used in recovery of organic compounds, the adsorbed compounds are often difficult to be desorbed quickly and thoroughly from the micropores in the adsorbents despite of the high adsorption capacity.

The problems addressed by the present invention are to overcome the deficiencies of prior adsorbents, such as slow desorbing rate resulted from the high level of micropore content in the adsorbents, and to improve both the adsorption and desorption performance of highly crosslinked adsorbents. Accordingly, the present invention provides a method of producing porous crosslinked aromatic copolymers in the presence of free radical initiator right after copolymerization without removal of porogen so as to reduce the micropore content in the post-crosslinked adsorbent.

The present invention is directed to a post-crosslinked adsorbent comprises:

monomer units of (a) at least 55 wt % at least one polyvinylaromatic monomer and (b) up to 45 wt % at least one monovinylaromatic monomer; and 0.5-2.5 mmol/g pendent vinyl groups;

wherein the dry adsorbent has BET specific surface area in the range of about 650-1000 $m^2/g$, BET average pore diameter 7.2-10 nm, BET porosity 1.29-2.45 mL/g, BJH adsorption micropore volume was less than 20% of total BJH adsorption pore volume, and HK micropore volume was less than 21% of total BJH adsorption pore volume.

The present invention is also directed to a one-pot method for preparing a polymeric adsorbent comprising the steps of:

(i) suspension copolymerizing monomers comprising at least one polyvinylaromatic monomer and at least one monovinylaromatic monomer in the presence of water insoluble organic compound as porogen;

(ii) post-crosslinking the copolymer with the porogen in the presence of free radical initiator and porogen/water cosolvent; and (iii) isolating the post-crosslinked adsorbent.

The present invention overcomes the disadvantages of the polymeric adsorbents of the state of art by providing a high specific surface area resin which adsorbs organic compounds with high capacity. The adsorbent with high porosity and low micropore content enables the adsorbed compounds be easily desorbed from the resin.

The first aspect of the present invention is directed to a post-crosslinked adsorbent comprises:

monomer units of (a) at least 55 wt % at least one polyvinylaromatic monomer and (b) up to 45 wt % at least one monovinylaromatic monomer; and 0.5-2.5 mmol/g pendent vinyl groups;

wherein the dry adsorbent has BET specific surface area in the range of about 650-1000 $m^2/g$, BET average pore diameter 7.2-10 nm, BET porosity 1.29-2.45 mL/g, BJH adsorption micropore volume was less than 20% of total BJH adsorption pore volume, and HK micropore volume was less than 21% of total BJH adsorption pore volume.

As used in the present invention, "BET" means Brunauer-Emmett-Teller theory, which is an adsorption model based on multilayer adsorption. BET average pore diameter is calculated with the equation of $D=4V/A$. (D—average pore diameter; V—pore volume; A—specific surface area)

As used herein, "BJH" means Barret-Joyner-Halenda scheme for calculation of pore size distribution from nitrogen adsorption data.

As used herein, "HK" means Horvath-Kawazoe method for evaluation of micropore size distribution from low pressure adsorption isotherms.

The monomers employed in the suspension copolymerization comprise at least one polyvinylaromatic monomer. The polyvinylaromatic monomers include the group consisting of divinylbenzene, mixture of meta-divinylbenzene and para-divinylbenzene, trivinylbenzene, divinyltoluene, divinylxylene, divinylnaphthalene, and their derivatives such as halide substituted, for example chlorodivinylbenzene. These compounds may be used alone or as a mixture of two or more thereof. An especially preferred polyvinylaromatic monomer mixture consists of meta- and para-divinylbenzene.

The amount of the polyvinylaromatic monomer (a) used in the first aspect of the invention is at least 55%, in percentage by weight based on the dry weight of the copolymer. Preferred is from 63% to 80%.

The term "at least" in a percentage range in the present invention means any and all amounts greater than and including the start point of the range through to 100% but not including 100%.

The monomers employed in the suspension copolymerization comprise at least one monovinylaromatic monomer. Examples of the monovinylaromatic monomers include, but not limit to, styrene and ($C_1$-$C_4$)alkyl-substituted styrenes such as ethylvinylbenzene, mixture of meta-ethylvinylbenzene and para-ethylvinylbenzene, vinyltoluene, vinylpyridine, and their derivatives such as halide substituted, for example vinylbenzyl chloride and ethylvinylbenzyl chloride. These compounds may be used alone or as a mixture of two or more thereof. Preferred is selected from the mixtures such as the mixture of meta- and para-ethylvinylbenzene and the mixture of styrene, meta- and para-ethylvinylbenzen.

The amount of the monovinylaromatic monomer (b) used in the first aspect of the invention is up to 45%, in percentage by weight based on the dry weight of the copolymer. Preferred is up to 37%, especially from 20% to 37%.

The term "up to" in a range means any and all amounts greater than zero and through to and including the end point of the range.

In an extreme embodiment the copolymer contains monomer units of, in percentage by weight based on the dry weight of the copolymer, (a) near 100% the mixture of meta- and para-divinylbenzene and (b) almost 0% the mixture of meta- and para-ethylvinylbenzene.

Optionally, the monomer units may contain up to 10%, preferred up to 5%, by weight based on the dry weight of the copolymer, copolymerized (c) polar vinyl monomers, such as acrylonitrile, methyl methacrylate, methyl acrylate. With the monomers mentioned herein, any monomer that falls in category (c) does not fall in category (a) or (b).

In one embodiment of the present invention the copolymer contains monomers of, in percentage by weight based on the dry weight of the copolymer, (a) from 55% to 63% at least one polyvinylaromatic monomer selected from meta-divinylbenzene, para-divinylbenzene, and the mixture of meta- and para-divinylbenzene; and (b) from 37% to 45% at least one monounsaturated vinylaromatic monomer selected from meta-ethylvinylbenzene; para-ethylvinylbenzene; styrene; the mixture of meta- and para-ethylvinylbenzene; and the mixture of styrene, meta- and para-ethylvinylbenzene.

In another more preferable embodiment of the present invention the copolymer contains monomers of, in percentage by weight based on the dry weight of the copolymer, (a) about 63% the mixture of meta- and para-divinylbenzene and (b) about 37% the mixture of meta- and para-ethylvinylbenzene.

Content of pendant vinyl group in the post-crosslinked adsorbent is in the range of 0.5-2.5 mmol/g, which is about ⅓ lower than that of the conventional copolymerized porous aromatic copolymer before post-crosslinking.

The adsorbent of the first aspect of the invention is preferably prepared by the method comprising the steps of:

(i) suspension copolymerizing monomers comprising at least one polyvinylaromatic monomer and at least one monovinylaromatic monomer in the presence of water insoluble organic compound as porogen;

(ii) post-crosslinking the copolymer with the porogen in the presence of free radical initiator and porogen/water co-solvent; and (iii) isolating the post-crosslinked adsorbent.

The second aspect of the present invention is further directed to a method for preparing a polymeric adsorbent comprising the steps of:

(i) suspension copolymerizing monomers comprising at least one polyvinylaromatic monomer and at least one monovinylaromatic monomer in the presence of water insoluble organic compound as porogen;

(ii) post-crosslinking the copolymer with the porogen in the presence of free radical initiator and porogen/water co-solvent;

(iii) isolating the post-crosslinked adsorbent.

The preparation method of the polymeric adsorbent comprises two reactions of copolymerization of the monomers and post-crosslinking of the copolymer with the presence of porogen in both reactions. The preparation method of the polymeric adsorbent in present invention can be conducted in a single reaction vessel, that is, the copolymerization and post-crosslinking reactions are completed neither by removing the porogen after the copolymerization reaction nor, as normally described in the art, by isolating of the initial copolymer before post-crosslinking.

The monomer units employed in the suspension copolymerization of the second aspect of the invention are the same as of the first aspect except for the amount. The method of preparation of the polymeric adsorbent of the invention is suitable for any of technically acceptable monomer units content. Preferably, the monomer units of the second aspect of the invention are at least 55 wt % at least one polyvinylaromatic monomer and up to 45 wt % at least one monovinylaromatic monomer. More preferable are 63-80 wt % at least one polyvinylaromatic monomer and 20-37 wt % at least one monovinylaromatic monomer.

The porogen which is employed in suspension copolymerization is selected from, as disclosed in the art, organic chlorides, such as, for example methylene dichloride, ethylene dichloride, propylene dichloride, chlorobenzene, chlorotoluene; hydrocarbons, such as cyclohexane, methylcyclohexane, ethylcyclohexane, benzene, toluene, xylene, ethylbenzene; and alcohols, such as methyl iso-butyl carbinol and di-isobutyl carbinol. The volume ratio of porogen to monomers is from 1:2 to 3:1, preferably from 1:1 to 2.5:1.

The copolymerization reaction is carried out in accordance with conventional methods, preferably in a continuous aqueous phase solution containing suspension aids (such as dispersants, protective colloids and buffers) followed by mixing with the organic phase solution containing monomers, porogens and initiators. The monomers are copolymerized at elevated temperature, and the copolymer is in bead form.

The copolymer bead obtained in the above suspension copolymerization is then post-crosslinked in the presence of a free radical initiator and porogen/water co-solvent to prepare a post-crosslinked copolymer bead with increased surface area and pore volume, which allows its usage as a polymeric adsorbent, ion-exchange resin, solvent impregnated resin or chelate resin.

The free radical initiator employed in post-crosslinking of the copolymer includes peroxide, such as, for example dibenzoyl peroxide, tert-butyl peroxy-2-ethylhexanoate, dilauroyl peroxide; azo-compound, such as azobis(iso-butyronitrile) and 2,2'-azobis(2-methylbutanenitrile). The preferred amount of free radical initiator is from about 0.5% to about 2% of the dry weight of copolymer.

Suitable organics acting as porogen/water co-solvent employed in the post-crosslinking includes, but not limit to di(ethylene glycol)mono-methyl ether, di(ethylene glycol) mono-ethyl ether, di(ethylene glycol)mono-butyl ether, di(ethylene glycol)dimethyl ether, di(ethylene glycol)diethyl ether, di(ethylene glycol)ethyl ether acetate, di(propylene glycol), di(propylene glycol)mono-methyl ether, tri(ethylene glycol), tri(ethylene glycol)mono-methyl ether, tri(ethylene glycol)mono-ethyl ether, tri(propylene glycol), poly(ethylene glycol)mono-methyl ether, poly(ethylene glycol)dimethyl ether, and poly(ethylene glycol)-co-(propylene glycol).

Removal of aqueous phase solution outside the copolymer prior to treatment with the free radical initiator and porogen/water co-solvent is preferred. The aqueous phase removal steps may comprise siphoning or discharging the aqueous phase solution from the reaction vessel, and adding the mixture of free radical initiator and porogen/water co-solvent. This is preferred followed by azeotropic distillation at elevated temperature until the distillate is clear.

The conditions preferred for the free radical post-crosslinking include elevating temperature, from about 25° C., preferably from 30° C., to the azeotropic temperature of porogen and water at atmospheric pressure. Heating is preferred to maintain the azeotropic distillation of porogen and water till more than 95% of the porogen is removed.

Post-treatment of the post-crosslinked copolymer may include siphoning (or discharging) the co-solvent, and washing the copolymer with water to remove the residual porogen and co-solvent.

In particular, copolymerization and post-crosslinking conditions have an effect on the surface area and pore volume of copolymer bead, where the copolymerization conditions include, for example, the molar ratio of styrene to ethylvinylbenzene, the amount of divinylbenzene as a crosslinking monomer, the degree of crosslinking, and the presence and type of porogen, and the post-crosslinking conditions include, for example, the amount of catalyst, reaction time, and the type of co-solvent.

EXAMPLES

The following examples are intended to illustrate the invention and not to limit it except as it is limited in the claims. All ratios, parts and percentages are by weight unless otherwise stated, and all reagents used are of good commercial quality unless otherwise specified. The abbreviations have the following meanings:

DVB—divinylbenzene
EVB—ethylvinylbenzene
TBP—tert-butyl peroxy-2-ethylhexanoate

BET specific surface area and BET porosity of the post-crosslinked polymeric adsorbents of the present invention are tested and analyzed by using the Micromeritics TriStar 3000 instrument. The percentage error of BET specific surface area is ±5%. The percentage error of BET average pore diameter is ±1%. BJH adsorption pore volume and HK micropore volume are tested and analyzed by using Quantachrome Nova Instrument.

IR and Raman spectra were used to determine the content of pendent vinyl groups, as described in K. L. Hubbard, et al., Reactive and Functional Polymers, Elsevier Science Publishers, vol. 36, pp 17-30(1998).

Example 1

To a 2 liter, 4-necked flask fitted with mechanical stirrer, reflux condenser, thermometer, nitrogen inlet, heating mantel, and thermowatch assembly was charged a premixed aqueous phase consisting of 800 g deionized water, 0.63 g dispersant, 2.1 g boric acid, and 0.61 g sodium hydroxide. The stirring rate was preset at 158 rpm and a slow nitrogen flow started. With agitator off, a premixed organic phase of 188.6 g 63% DVB/37% EVB, 440.5 g toluene, and 2.00 g TBP was added. Agitation was started, and the mixture was heated to 60-80° C. and held at the temperature for 6 hours.

The reaction mixture was then cooled to 50° C. The aqueous phase was siphoned away from the copolymer-toluene mixture. Mixture of 800 g porogen/water co-solvent and 2.00 g TBP was added, and the copolymer-toluene-water-TBP-co-solvent mixture was further heated to post-cross-link the copolymer and remove toluene through azeotropic distillation while maintaining a fluid dispersion by addition of the mixture of co-solvent and water.

On cooling, the liquid phase was siphoned away, and the copolymer was washed by water. The post-crosslinked copolymer was recovered as white, translucent beads. Upon characterization of the pore structure of the copolymer, it has the following properties: 1.2 mmol/g pendent vinyl groups, BET porosity of 1.74 mL/g, BET surface area of 825 m$^2$/g, BET average pore diameter 8.43 nm. BJH adsorption pore volume of 1.83 mL/g, BJH adsorption micropore volume of 0.303 mL/g (16.6% of the total BJH adsorption pore volume), and HK micropore volume of 0.325 mL/g (17.8% of the total BJH adsorption pore volume).

Examples 2-6 were conducted in a fashion similar to that described in Example 1. However, various premixed organic phases were employed.

Example 2

Premixed organic phase of 209 g 63% DVB/37% EVB, 418 g toluene, and 2.1 g TBP, 1.1 mmol/g pendant vinyl groups, BET porosity of 1.53 mL/g, BET surface area of 831 m$^2$/g, BET average pore diameter 7.36 nm. BJH adsorption pore volume of 1.71 mL/g, BJH adsorption micropore volume of 0.306 mL/g (17.9% of the total BJH adsorption pore volume), and HK micropore volume of 0.334 mL/g (19.5% of the total BJH adsorption pore volume).

Example 3

Premixed organic phase of 209 g 55% DVB/45% EVB, 418 g toluene, and 2.1 g TBP, 0.5 mmol/g pendant vinyl groups, BET porosity of 1.29 mL/g, BET surface area of 656 m$^2$/g, BJH adsorption pore volume of 1.36 mL/g, BET average pore diameter 7.87 nm BJH adsorption micropore volume of 0.270 mL/g (19.9% of the total BJH adsorption pore volume), and HK micropore volume of 0.285 mL/g (20.9% of the total BJH adsorption pore volume).

Example 4

Premixed organic phase of 220 g 80% DVB/20% EVB, 409 g toluene, and 2.2 g TBP, 2.5 mmol/g pendant vinyl groups, BET porosity of 1.68 mL/g, BET surface area of 856 m$^2$/g, BET average pore diameter 7.85 nm BJH adsorption pore volume of 1.85 mL/g, BJH adsorption micropore volume of 0.330 mL/g (17.8% of the total BJH adsorption pore volume), and HK micropore volume of 0.368 mL/g (19.9% of the total BJH adsorption pore volume).

Example 5

Premixed organic phase of 189 g 80% DVB/20% EVB, 440 g toluene, and 2.2 g TBP, 2.4 mmol/g pendant vinyl groups, BET porosity of 2.45 mL/g, BET surface area of 986 m$^2$/g, BET average pore diameter 9.94 nm BJH adsorption pore volume of 2.85 mL/g, BJH adsorption micropore volume of 0.430 mL/g (15.1% of the total BJH adsorption pore volume), and HK micropore volume of 0.468 mL/g (16.4% of the total BJH adsorption pore volume).

Example 6

Premixed organic phase of 165 g 80% DVB/20% EVB, 44 g styrene, 418 g toluene, and 2.1 g TBP, 1.1 mmol/g pendant vinyl groups, BET porosity of 1.52 mL/g, BET surface area of 838 m$^2$/g, BET average pore diameter 7.26 nm. BJH adsorption pore volume of 1.70 mL/g, BJH adsorption micropore volume of 0.303 mL/g (17.8% of the total BJH adsorption pore volume), and HK micropore volume of 0.331 mL/g (19.5% of the total BJH adsorption pore volume).

We claim:
1. A method for preparing a polymeric adsorbent comprises the steps of:
   (i) suspension copolymerizing monomers comprising at least one polyvinylaromatic monomer and at least one monovinylaromatic monomer in the presence of water insoluble organic compound as porogen;

(ii) post-crosslinking the copolymer with the porogen in the presence of free radical initiator and porogen/water co-solvent; and (iii) isolating the post-crosslinked adsorbent.

2. The method according to claim 1, wherein the polyvinylaromatic monomer is mixture of meta- and para-divinylbenzene.

3. The method according to claim 2, wherein the monovinylaromatic monomer is selected from the mixture of meta- and para-ethylvinylbenzene and the mixture of styrene, meta- and para-ethylvinylbenzen.

4. The method according to claim 1, wherein the monomer units comprise (a) at least 55% at least one polyvinylaromatic monomer and (b) up to 45% at least one monounsaturated vinylaromatic monomer.

5. The method according to claim 4, wherein the monomer units comprise, in percentage by weight based on the dry weight of the copolymer, (a) from 63% to 80% at least one polyvinylaromatic monomer and (b) from 20% to 37% at least one monounsaturated vinylaromatic monomer.

6. The method according to claim 1, wherein the free radical initiator is selected from the group consisting of peroxide compound and azo compound.

7. The method according to claim 6, wherein the free radical initiator is tert-butyl peroxy-2-ethylhexanoate.

8. The method according to claim 1, wherein the porogen is selected from methylene dichloride, ethylene dichloride, propylene dichloride, chlorobenzene, chlorotoluene; hydrocarbons, cyclohexane, methylcyclohexane, ethylcyclohexane, benzene, toluene, xylene, ethylbenzene, methyl iso-butyl carbinol and di-iso-butyl carbinol.

* * * * *